United States Patent [19]

Kato et al.

[11] Patent Number: 5,393,583
[45] Date of Patent: Feb. 28, 1995

[54] CONNECTOR

[75] Inventors: Tetsuo Kato; Masahiro Kanda, both of Shizuoka, Japan

[73] Assignee: Yazaki Corporation, Tokyo, Japan

[21] Appl. No.: 63,424

[22] Filed: May 19, 1993

[30] Foreign Application Priority Data

May 29, 1992 [JP] Japan ................... 4-139030

[51] Int. Cl.$^6$ ............................................. C08L 67/02
[52] U.S. Cl. ................... 428/36.92; 525/175; 525/176
[58] Field of Search ..................... 428/36.92; 525/175, 525/176

[56] References Cited

U.S. PATENT DOCUMENTS

| | | | |
|---|---|---|---|
| 4,246,374 | 1/1981 | Kopchik | 525/329 |
| 4,275,374 | 6/1981 | Chaucer | 337/197 |
| 4,727,117 | 2/1988 | Hallden-Abberton et al. | 525/343 |
| 4,954,574 | 9/1990 | Hallden-Abberton | 525/327.6 |
| 5,096,968 | 3/1992 | Sasaki | 525/142 |

Primary Examiner—James J. Seidleck
Assistant Examiner—I. Zemel
Attorney, Agent, or Firm—Sughrue, Mion, Zinn, Macpeak & Seas

[57] ABSTRACT

A connector comprising a housing comprising a resin composition comprising (A) from 30 to 90% by weight of an aromatic polyester, (B) from 5 to 40% by weight of a modified polyolefin, and (C) from 5 to 30% by weight of a polyglutarimide having a repeating unit represented by the following formula (1):

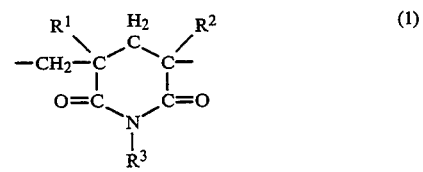

wherein $R^1$ and $R^2$ each represents a hydrogen atom or a lower alkyl group, and $R^3$ represents a hydrogen atom, an alkyl group, an aryl group, an alkaryl group, or an aralkyl group.

4 Claims, 2 Drawing Sheets

CONNECTOR

FIELD OF THE INVENTION

The present invention relates to a connector which is lightweight and is excellent in dimensional stability, heat resistance, mechanical properties, and productivity and also in fitting feeling.

BACKGROUND OF THE INVENTION

Connectors having various kinds of plastic housings (hereinafter, sometimes referred to simply as "connectors") have conventionally been used for connecting the circuits of electric and electronic instruments or devices for use in motor vehicles. With the recent progress in weight reduction in motor vehicles together with the production of lower-pollution motor vehicles, there is a growing demand for more lightweight connectors. Further, with the increase of the performance and function of motor vehicles, the connectors have come to be required to have a smaller size, more complicated form, improved heat resistance, and improved fitting feeling. The connectors are also required to have improved productivity.

Polybutylene terephthalate (PBT) resins, which are excellent in heat resistance, dimensional stability and moldability, are used in conventional connectors in large quantities. However, these connectors have had a problem of large weight due to the high specific gravity of the PBT resins. Although 6-nylon resins and 6,6-nylon resins can be advantageously used in the weight reduction of connectors since these resins have lower specific gravities than PBT resins, the nylon resins have had a problem that they have a high water absorption and hence the connectors, upon water absorption, suffer a dimensional change and deterioration in mechanical properties. Thus, 6-nylon and 6,6-nylon resins are not suitable for use in the miniaturization, complication in form, and improvement in fitting feeling of connectors.

In addition to those resins, polypropylene (PP) resins, polyphenylene ether (PPE) resins, ABS resins, and other resins have also been used. Such resins, however, are unsatisfactory because they are inferior in heat resistance, chemical resistance, fluidity, etc.

Although attempts are being made to reduce the weight of the connectors employing these resins by foaming, incorporation of a hollow filler or other means, such techniques have been defective in, for example, that the molding accuracy is insufficient and the deterioration of the mechanical properties is severe.

SUMMARY OF THE INVENTION

An object of the present invention is to solve the above-described problems of the conventional techniques and to provide a connector which is lightweight and is excellent in dimensional stability, heat resistance, mechanical properties, and productivity and also in fitting feeling.

Other objects and effects of the present invention will be apparent from the following description.

As a result of intensive investigations made by the present inventors in order to attain the above objects, it has been found that the above objects can be attained with a connector employing a housing formed by molding a resin composition obtained by mixing an aromatic polyester with specific synthetic resins in specific proportions. The present invention has thus been accomplished.

The present invention relates to a connector comprising a housing comprising a resin composition comprising (A) from 30 to 90% by weight of an aromatic polyester, (B) from 5 to 40% by weight of a modified polyolefin, and (C) from 5 to 30% by weight of a polyglutarimide having a repeating unit represented by formula (1):

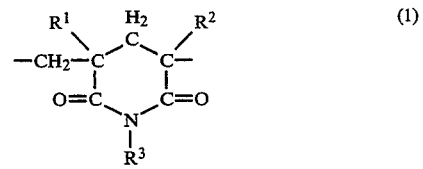

wherein $R^1$ and $R^2$ each represents a hydrogen atom or a lower alkyl group, and $R^3$ represents a hydrogen atom, an alkyl group, an aryl group, an alkaryl group, or an aralkyl group.

DETAILED DESCRIPTION OF THE INVENTION

Figure 1:
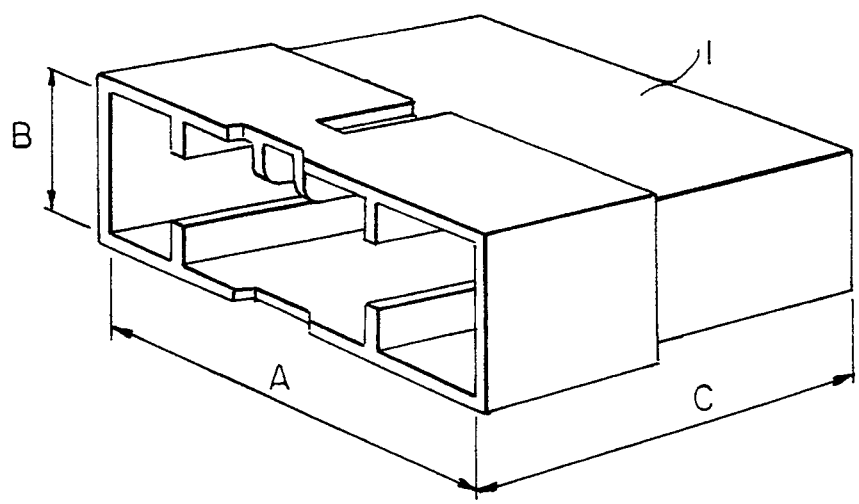
FIG. 1 is a slant view showing an external housing of the connector for motor vehicle obtained in the Example of the present invention.

Examples of the aromatic polyester (A) contained in the resin composition used in the connector of the present invention include a polyester having aromatic rings in the polymer backbone. The polyester is a polymer or copolymer obtained by the condensation reaction of a monomer mixture containing, as major components, an aromatic dicarboxylic acid or its derivative capable of forming esters, and a diol or its derivative capable of forming esters.

Examples of the aromatic dicarboxylic acid component include benzene nucleus-containing dicarboxylic acids such as terephthalic acid and isophthalic acid, naphthalene nucleus-containing dicarboxylic acids such as naphthalene-2,6-dicarboxylic acid, naphthalene-1,5-dicarboxylic acid, and naphthalene-2,7-dicarboxylic acid, and their derivatives capable of forming esters.

The aromatic dicarboxylic acid and the derivative thereof may be used in combination with a nonaromatic dicarboxylic acid, e.g., adipic acid or sebacic acid, their derivative capable of forming esters, or the like. In this case, up to 20% by mole of the aromatic dicarboxylic acid component may be replaced with such a nonaromatic compound.

Examples of the diol component include aliphatic glycols such as ethylene glycol, tetramethylene glycol, hexamethylene glycol, diethylene glycol, and cyclohexane-dimethanol, aromatic nucleus-containing diols such as 1,4-bishydroxyethoxybenzene and bisphenol A, and their derivatives capable of forming esters.

Of the aromatic polyesters obtained from the above-described components through condensation reaction, polybutylene terephthalate is especially preferred.

Examples of the modified polyolefin (B) contained in the resin composition used in the connector of the present invention include a modified polymer obtained by reacting a polyolefin with a monomer containing a glycidyl ether group and a monomer containing an acid anhydride group.

Examples of the polyolefin include polypropylene, random or block copolymers of propylene with an α-olefin, e.g., ethylene, which copolymers have a propylene unit content of 50% by mole or higher, preferably 80% by mole or higher, and blends of these polymers with up to 40% by weight of an olefin-based elastomer such as an ethylene-propylenediene terpolymer rubber, ethylene-propylene copolymer rubber, or ethylene-butene copolymer rubber.

Examples of the monomer containing a glycidyl ether group include glycidyl methacrylate and glycidyl acrylate. Examples of the monomer containing an acid anhydride group include maleic anhydride and itaconic anhydride. Other compounds that can be used for polyolefin modification along with the aforementioned monomers include monoolefins such as ethylene, propylene, 1-butene, and 1-pentene; dienes such as butadiene, isoprene, and chloroprene; copolymerizable polymers such as random copolymers of propylene and an unconjugated diene; and vinyl monomers such as styrene, acrylic esters, and vinyl acetate. These compounds for modification are generally used in such amounts as to yield a modified polyolefin having a glycidyl ether group content of 1 to 10% by weight and an acid anhydride group content of 0.05 to 1% by weight. If the glycidyl ether group content or acid anhydride group content is too low, the modified polyolefin tends to have insufficient compatibility with the polyester component. Too high contents thereof are also not preferred in that the composition tends to have an increased melt viscosity to show impaired processability.

The polyglutarimide (C) contained in the resin composition used in the connector of the present invention is a polymer containing a cyclic group (repeating unit) represented by formula (1):

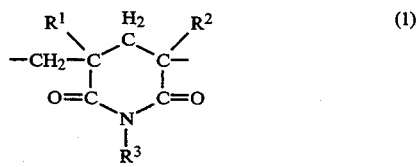

In formula (1), $R^1$ and $R^2$ each represents a hydrogen atom or a lower alkyl group. Examples of the lower alkyl group include those having from 1 to 8 carbon atoms, e.g., straight-chain, branched, or cyclic alkyl groups such as methyl, ethyl, n-propyl, sec-propyl, isobutyl, i-amyl, cyclohexyl, and 2-ethylhexyl. These groups may be substituted by a halogen atom, such as chlorine or fluorine, a hydroxyl group or other substituents. Among these, a methyl group is preferred as both $R^1$ and $R^2$.

$R^3$ represents a hydrogen atom, an alkyl group, an aryl group, an alkaryl group, or an aralkyl group. Among these, a lower alkyl group having 1 to 4 carbon atoms is preferred, with a methyl group being especially preferred.

The above-described glutarimide ring may be the only repeating unit contained in the polyglutarimide, or may constitute a glutarimide copolymer in cooperation with other repeating unit(s). Examples of the co-monomer(s) that can be incorporated in such a copolymer include alkyl (meth)acrylates, (meth)acrylic acid, (meth)acrylic anhydride, (meth)acrylamide, (meth)acrylimide, (meth)acrylonitrile, styrene, and vinyl chloride. Among these, lower alkyl (meth)acrylates are preferably used, with methyl (meth)acrylate being especially preferred.

The term "(meth)acrylic" and the like used herein means "acrylic or methacrylic".

A preferred example of the polyglutarimide for use in the present invention is a copolymer of glutarimide or a derivative thereof and one or more of the above-enumerated co-monomers, with the glutarimide unit content being at least 50%, and more preferably at least 80%.

The polyglutarimide can be produced by any of various known reactions. Examples thereof include the solution or melt reaction of a polymer having a high (meth)acrylic ester group content, such as a homopolymer or copolymer of a (meth)acrylic ester, with ammonia or an amine; the reaction of a methacrylic acid-methacrylic ester copolymer with ammonia, an amine, urea, or a substituted urea at a high temperature; the reaction of polymethacrylic anhydride with ammonia or an amine; and the imide ring-forming thermal reaction of a methacrylic ester-methacrylamide copolymer. Preferred of these methods is the solution or melt reaction of a poly(meth)acrylic ester with an amine which reaction, described in U.S. Pat. No. 4,246,374.

The thus-produced polyglutarimide may be subjected to a post-treatment for diminishing the acid and/or acid anhydride according to the method described in U.S. Pat. 4,727,117. While the polyglutarimide in which the acid content has been reduced by this method can be advantageously used for producing the connector of the present invention, polyglutarimides containing an acid and/or an acid anhydride are also usable.

The proportions of the above-described aromatic polyester (A), modified polyolefin (B), and polyglutarimide (C) to be mixed are from 30 to 90% by weight, from 5 to 40% by weight, and from 5 to 30% by weight, respectively. The preferred range of the proportion of the modified polyolefin (B) is from 10 to 20% by weight, and that of the polyglutarimide (C) is from 10 to 20% by weight. All the percents for the amount of the ingredients (A), (B) and (C) are based on the total amount of the ingredients (A), (B) and (C). If the amount of the modified polyolefin (B) is less than 5% by weight, a sufficient weight-reducing effect for the connector cannot be obtained. The amount of the modified polyolefin (B) of more than 40% by weight is also not preferred in that not only the composition has impaired rigidity, resulting in a decrease in mechanical properties, e.g., terminal-holding strength, but also the composition has significantly impaired heat resistance. If the amount of the polyglutarimide (C) is less than 5% by weight, a sufficient rigidity-improving effect cannot be obtained. The amount of the polyglutarimide (C) or more than 30% by weight is also not preferred in that this results in a considerable decrease in rigidity.

The resin composition for use in producing the connector of the present invention may contain polymers other than the essential polymers described above and various kinds of additives such as a stabilizer, pigment, flame retardant, release agent, and inorganic filler, as long as the these ingredients used do not defeat the object of the present invention.

Examples of the stabilizer include a phenolic antioxidant, phosphorus compound antioxidant, and sulfur compound antioxidant. As the phenolic antioxidant, a hindered phenolic compound commonly added in order to improve the heat resistance of resins may be used. Specific examples thereof include 2,6-di-t-butyl-p-cresol, 2,2′-methylenebis-(4-methyl-6-t-butylphenol), 4,4′-thiobis(3-methyl-6-t-butylphenol), 1,1,3-tris(2-methyl-4-hydroxy-5-t-butylphenyl)butane, pentaerythrityl tetrakis[3-(3,5-di-t-butyl-4-hydroxyphenyl)propionate], and octadecyl 3-(3,5-di-t-butyl-4-hydroxyphenyl)propionate. Examples of the phosphorus compound antioxidant include triphenyl phosphite, tris(dioctadecyl) phosphite, tris(nonylphenyl) phosphite, trilauryl trithiophosphite, bis(3-methyl-1,5-di-t-butylphenyl)pentaerythritol diphosphite, and tris(2,4-di-t-butylphenyl) phosphite.

The methods for producing the resin composition used in producing the connector of the present invention are not particularly limited. While any desired mixing method may be used, it is preferred to employ a method which can uniformly disperse each of the ingredients mixed. Examples of the mixing method include a method in which the ingredients are mixed together simultaneously or separately, and the mixture is homogenized with a mixing machine such as, for example, a blender, kneader, roll mill, or extruder. The thus homogenized composition may be used as it is in a powder form, or may be used after being melt-kneaded and then pelleted.

The connector according to the present invention has a housing molded from the resin composition produced as described above. This molding can be conducted by a known technique, e.g., injection molding. The housing can be properly fabricated by appropriately selecting the number and form of poles into which connector terminals are to be inserted, the form of a locking part, the form of the housing part, etc. There are no particular limitations not only on the use of the connector but also on the kind, form, etc. thereof.

The present invention will be explained below in more detail with reference to the following examples, but the present invention is not construed as being limited thereto.

EXAMPLES 1 TO 5 AND COMPARATIVE EXAMPLES 1 TO 6

Polybutylene terephthalate, as the aromatic polyester (A), which had an intrinsic viscosity of 1.10 and had been dried at 130° C. for 5 hours was mixed with a modified polyolefin (B) having a glycidyl ether group and an acid anhydride group ("Tonen CMP, HA-300", manufactured by Tonen Kagaku K. K., Japan) and a polyglutarimide (C) ("EXL-4241", manufactured by Rohm & Haas Co.) produced by reacting polymethyl methacrylate with methylamine according to the formulations given in Table 1 by means of a twin-cylinder mixer. Each of the blends was melt-extruded into molding pellets at 250° C. using a twin-screw extruder (diameter: 44 mm).

TABLE 1

| | (Formulations for resin composition) | | |
|---|---|---|---|
| | | Ingredient | |
| Composition | A (wt %) | B (wt %) | C (wt %) |
| a | 70 | 10 | 20 |
| b | 65 | 15 | 20 |

TABLE 1-continued

| | (Formulations for resin composition) | | |
|---|---|---|---|
| | | Ingredient | |
| Composition | A (wt %) | B (wt %) | C (wt %) |
| c | 50 | 30 | 20 |
| d | 75 | 15 | 10 |
| e | 60 | 15 | 25 |
| f* | 100 | — | — |
| g* | 80 | 20 | — |
| h* | 80 | — | 20 |
| i* | 77 | 3 | 20 |
| j* | 77 | 20 | 3 |
| k* | 15 | 45 | 40 |

Note: *Comparative compositions

Figure 2:
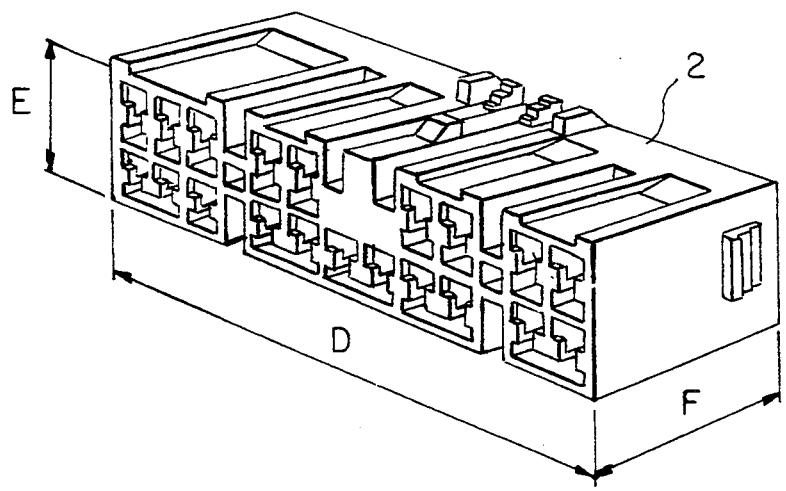
FIG. 2 is a slant view showing an internal housing of the connector for motor vehicle obtained in the Example of the present invention.

The thus-prepared resin compositions were used to mold external and internal connector housings having the forms shown in FIGS. 1 and 2, respectively, using an injection molding machine ("IS55EN", manufactured by Toshiba Corp., Japan) under the following molding conditions, thereby to obtain connectors according to the present invention and comparative connectors.

Injection Molding Conditions

Cylinder temperature: 260° C.
Mold temperature: 25° C.
Injection pressure: 900 kgf/cm$^2$
Injection speed: intermediate The height, width, and depth (i.e., B, A, and C, respectively, in FIG. 1) of each of the external connector housings were 15.2 mm, 56.3 mm, and 36.0 mm, respectively, and the volume thereof was 11.63 cm$^3$. The height, width, and depth (i.e., E, D, and F, respectively, in FIG. 2) of each of the internal connector housings were 10.8 mm, 52.3 mm, and 20.0 mm, respectively, and the volume thereof was 5.33 cm$^3$. In FIGS. 1 and 2, numeral 1 denotes an external housing and 2 denotes an internal housing.

COMPARATIVE EXAMPLE 7

Connector housings were molded under the same molding conditions as in Example 1 except that a 6,6-nylon resin ("2020 UW1", manufactured by Ube Industries, Ltd., Japan) was used in place of the resin composition used in Example 1 and that the cylinder temperature was changed to 280° C. Thus, a comparative connector was obtained.

Each of the connector housings obtained above was evaluated for the following properties and compared.
(1) Lightweight Property:
The specific gravity of each housing was measured by the water displacement method.
(2) Dimensional Change by Water Absorption:
Each housing was subjected to a moistening treatment under conditions of 35° C. and 95% RH until the water absorption reached saturation, and the changes of the dimensions of A, B, C, D, E, and F in FIGS. 1 and 2 were then measured. With respect to each of A to F, the degree of dimensional change (%) through the treatment based on the dimension immediately after molding was calculated using the following equation and evaluated.

Degree of dimensional change $(\%) = (A-B)/B \times 100$

Figure 3:
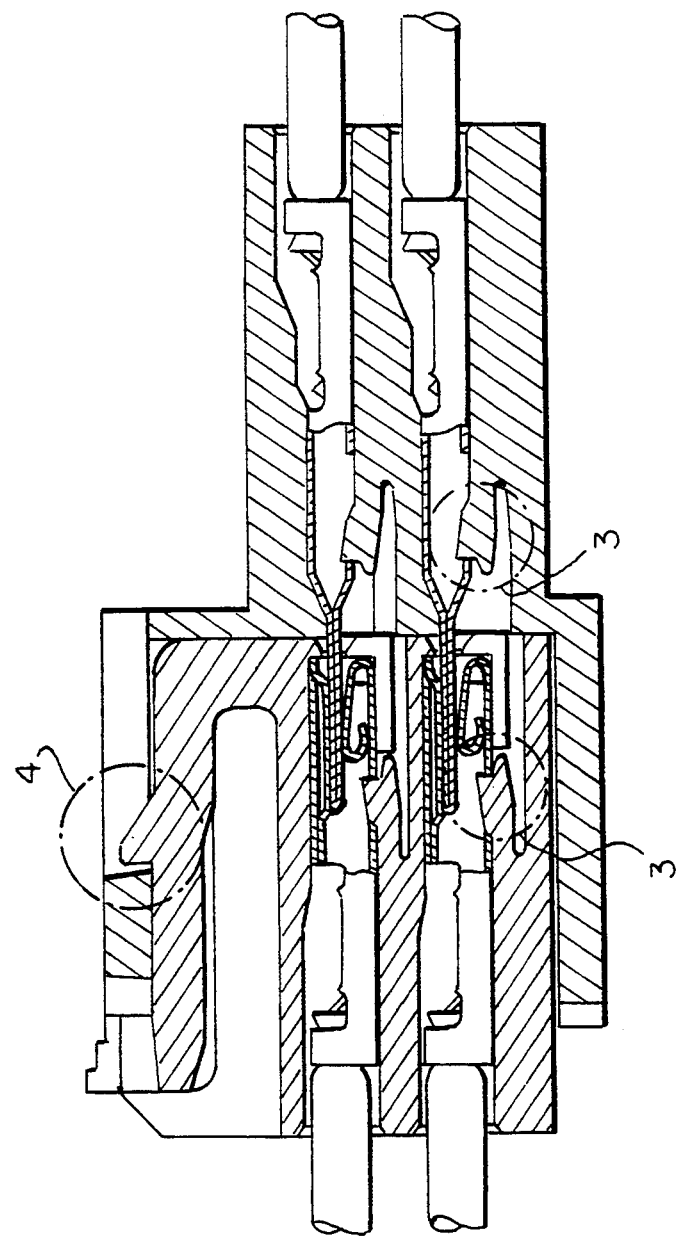
FIG. 3 is a cross sectional view showing a connector for motor vehicle produced in the Example of the present invention where an external and internal housings are fitted to each other.

A: Each dimension at saturation of water absorption
B: Each dimension immediately after molding (3) Heat Resistance:

Terminals each having welded thereto an electric wire about 100 mm long were fixed to housings that had heat-treated at 120° C. for 1,000 hours and also to housings immediately after molding, as shown in FIG. 3. In FIG. 3, numeral 3 denotes an engaging part for the housing and a terminal and 4 denotes an engaging part for the external and internal housings. Each electric wire was then pulled in the axial direction at a constant rate of about 100 mm/min, and the load (terminal holding strength) (kgf) at the time when the terminal was drawn from the fixing part 3 of the housing was measured. The housings were also examined for appearance change due to the heat treatment.

(4) Fitting Property:

The housings were subjected to a moistening treatment under conditions of 35° C. and 95% RH until the water absorption reached saturation. Each external housing was then fitted to the corresponding internal housing in an anechoic chamber at a rate of 250 mm/min, and the sound pressure level of the fitting sound emitted from the fixing part 4 was measured with a noise meter. The sound pressure level data were further subjected to a frequency analysis using an analyzing recorder (manufactured by Yokogawa Hokushin Electric Corp., Japan) to evaluate the fitting property. Connectors having a high sound pressure level are regarded as good in fitting feeling or fitting property.

The results of the above evaluations are summarized in Tables 2, 3, and 4. In Tables 2 to 4, the term "initial" means "immediately after molding".

TABLE 2

| | | | Lightweight property and dimensional change by water absorption | | | | | |
|---|---|---|---|---|---|---|---|---|
| | | Specific | Degree of dimensional change by water absorption | | | | | |
| | Composition | gravity | A | B | C | D | E | F |
| Example 1 | a | 1.24 | 0.078 | 0.020 | 0.058 | 0.046 | 0.024 | 0.061 |
| Example 2 | b | 1.21 | 0.080 | 0.021 | 0.064 | 0.041 | 0.019 | 0.063 |
| Example 3 | c | 1.15 | 0.080 | 0.020 | 0.061 | 0.047 | 0.023 | 0.057 |
| Example 4 | d | 1.23 | 0.080 | 0.023 | 0.049 | 0.042 | 0.021 | 0.059 |
| Example 5 | e | 1.20 | 0.079 | 0.021 | 0.053 | 0.044 | 0.024 | 0.059 |
| Comparative Example 1 | f* | 1.31 | 0.080 | 0.024 | 0.063 | 0.042 | 0.024 | 0.058 |
| Comparative Example 2 | g* | 1.23 | 0.080 | 0.020 | 0.062 | 0.044 | 0.024 | 0.053 |
| Comparative Example 3 | h* | 1.30 | 0.080 | 0.023 | 0.061 | 0.041 | 0.024 | 0.062 |
| Comparative Example 4 | i* | 1.29 | 0.080 | 0.026 | 0.057 | 0.039 | 0.023 | 0.060 |
| Comparative Example 5 | j* | 1.21 | 0.079 | 0.022 | 0.060 | 0.044 | 0.024 | 0.057 |
| Comparative Example 6 | k* | 1.00 | 0.080 | 0.024 | 0.061 | 0.041 | 0.024 | 0.059 |
| Comparative Example 7 | 6,6-nylon* | 1.14 | 1.035 | 1.195 | 1.088 | 1.271 | 1.092 | 0.958 |

Note: *Comparative compositions

TABLE 3

| | | Heat resistance | | | | |
|---|---|---|---|---|---|---|
| | | Terminal-holding strength (kgf) | | | | |
| | | Initial | | After heating | | Appearance |
| | Composition | External | Internal | External | Internal | after heating |
| Example 1 | a | 8.1 | 8.0 | 8.4 | 8.3 | unchanged |
| Example 2 | b | 8.1 | 8.0 | 8.4 | 8.3 | unchanged |
| Example 3 | c | 7.8 | 7.6 | 8.2 | 8.2 | unchanged |
| Example 4 | d | 8.0 | 7.9 | 8.4 | 8.2 | unchanged |
| Example 5 | e | 8.3 | 8.2 | 8.9 | 8.8 | unchanged |
| Comparative Example 1 | f* | 8.5 | 8.4 | 8.9 | 8.7 | unchanged |
| Comparative Example 2 | g* | 5.7 | 5.3 | 6.0 | 5.7 | unchanged |
| Comparative Example 3 | h* | 8.4 | 8.2 | 4.2 | 3.6 | unchanged |
| Comparative Example 4 | i* | 8.6 | 8.2 | 4.1 | 3.2 | unchanged |
| Comparative Example 5 | j* | 5.6 | 5.4 | 5.9 | 5.7 | unchanged |
| Comparative Example 6 | k* | 7.2 | 7.0 | 4.0 | 4.2 | unchanged |
| Comparative Example 7 | 6,6-nylon* | 12.3 | 10.5 | 12.8 | 10.2 | browned |

Note: *Comparative compositions

TABLE 4

|  | Composition | Fitting property Initial | | After water absorption | |
|---|---|---|---|---|---|
|  |  | Frequency (KHz) | Sound pressure (dB) | Frequency (KHz) | Sound pressure (dB) |
| Example 1 | a | 2.7 | 87 | 2.7 | 86 |
| Example 2 | b | 2.7 | 87 | 2.7 | 86 |
| Example 3 | c | 2.7 | 84 | 2.7 | 83 |
| Example 4 | d | 2.7 | 86 | 2.7 | 84 |
| Example 5 | e | 2.7 | 88 | 2.7 | 86 |
| Comparative Example 1 | f* | 2.7 | 87 | 2.7 | 86 |
| Comparative Example 2 | g* | 2.7 | 81 | 2.7 | 81 |
| Comparative Example 3 | h* | 2.7 | 88 | 2.7 | 87 |
| Comparative Example 4 | i* | 2.7 | 88 | 2.7 | 88 |
| Comparative Example 5 | j* | 2.7 | 81 | 2.7 | 80 |
| Comparative Example 6 | k* | 2.7 | 86 | 2.7 | 85 |
| Comparative Example 7 | 6,6-nylon* | 2.9 | 83 | 2.9 | 72 |

Note: *Comparative compositions

As shown in Tables 2, 3, and 4, it is understood that the connectors of Examples 1 to 3 according to the present invention are low in specific gravity and excellent in lightweight property, have excellent dimensional stability to cause no problem concerning dimensional change due to water absorption during practical use, are excellent in mechanical properties and heat resistance, and give a sufficient fitting feeling, with the decrease in fitting property due to water absorption being very slight.

In contrast, the connector of Comparative Example 1 is defective in that it has a high specific gravity and hence has poor lightweight property. The connectors of Comparative Examples 2 and 5 do not withstand practical use because they are inferior in terminal-holding strength at the initial stage and after the heat treatment. Further, the connectors of Comparative Examples 3, 4, and 6 are inferior in heat resistance, while that of Comparative Example 7 is inferior in stability to dimensional change due to water absorption and in fitting property.

As described above, the connector of the present invention has the effects of being lightweight, suffering only little dimensional change upon water absorption, having high heat resistance and good mechanical properties, e.g., terminal-holding strength, giving extremely good fitting feeling, and having excellent productivity.

While the invention has been described in detail and with reference to specific embodiments thereof, it will be apparent to one skilled in the art that various changes and modifications can be made therein without departing from the spirit and scope thereof.

What is claimed is:

1. A connector comprising a housing comprising a resin composition comprising (A) from 30 to 90% by weight of an aromatic polyester, (B) from 5 to 40% by weight of a modified polyolefin, and (C) from 5 to 30% by weight of a polyglutarimide having a repeating unit represented by the following formula (1):

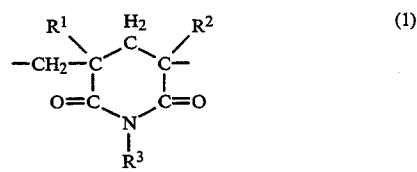

wherein $R^1$ and $R^2$ each represents a hydrogen atom or a lower alkyl group, and $R^3$ represents a hydrogen atom, an alkyl group, an aryl group, an alkaryl group, or an aralkyl group, wherein said modified polyolefin (B) is a modified polypropylene having a glycidyl ether group content of from 1 to 10% by weight and an acid anhydride group content of from 0.05 to 1% by weight.

2. A connector as claimed in claim 1, wherein said aromatic polyester (A) is polybutylene terephthalate.

3. A connector as claimed in claim 1, wherein $R^1$ and $R^2$ each represents a methyl group, and $R^3$ represents a lower alkyl group having from 1 to 4 carbon atoms.

4. A connector as claimed in claim 1, wherein the amount of said modified polyolefin is from 10 to 20% by weight, and the amount of said polyglutarimide is from 10 to 20% by weight.

* * * * *